United States Patent Office 3,187,212
Patented June 1, 1965

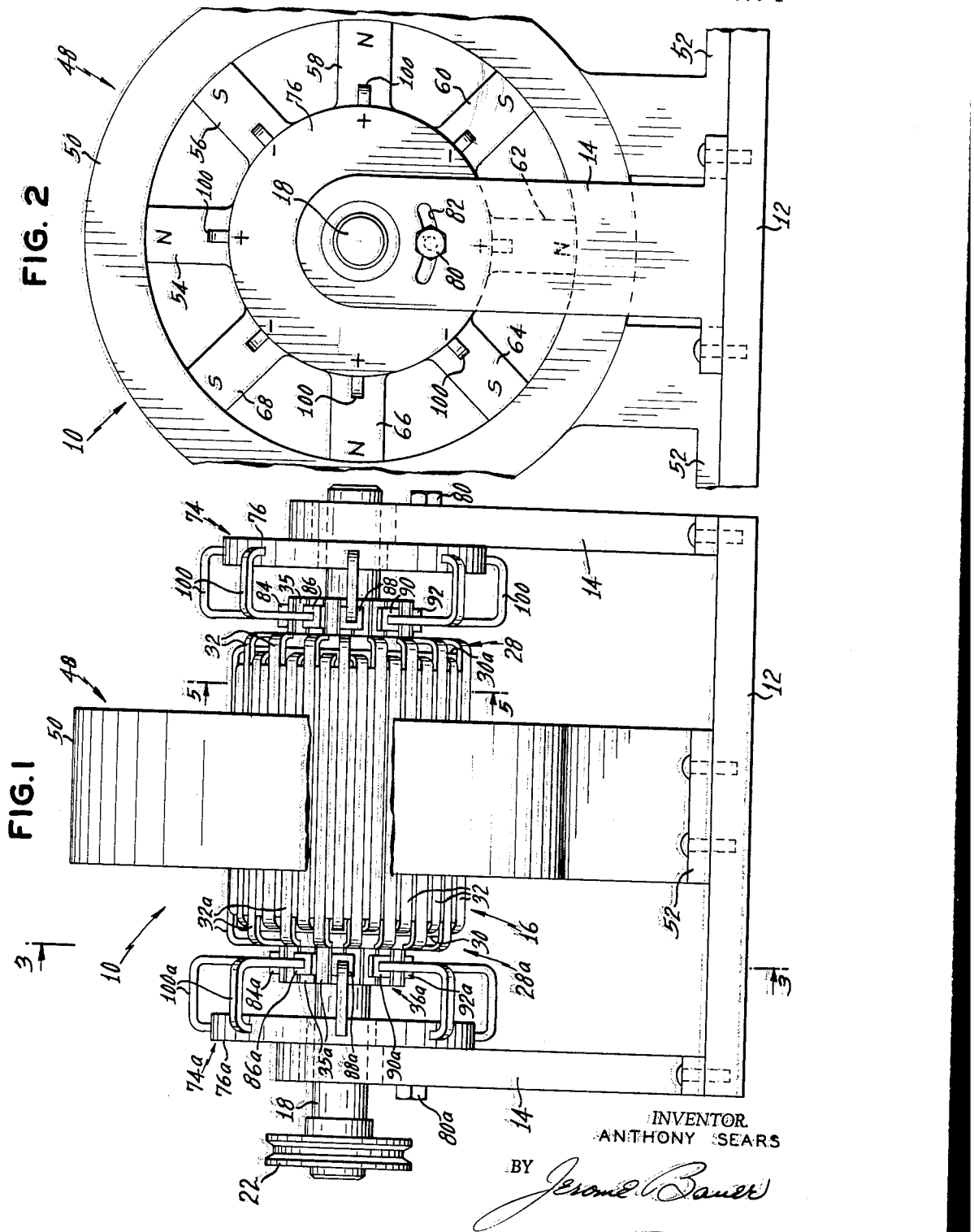
June 1, 1965  A. SEARS  3,187,212
DIRECT CURRENT GENERATOR
Filed April 19, 1963  4 Sheets-Sheet 1
INVENTOR.
ANTHONY SEARS
BY Jerome Bauer
ATTORNEY INVENTOR.
ANTHONY SEARS
BY Jerome Bauer
ATTORNEY INVENTOR.
ANTHONY SEARS
BY
Jerome Bauer
ATTORNEY

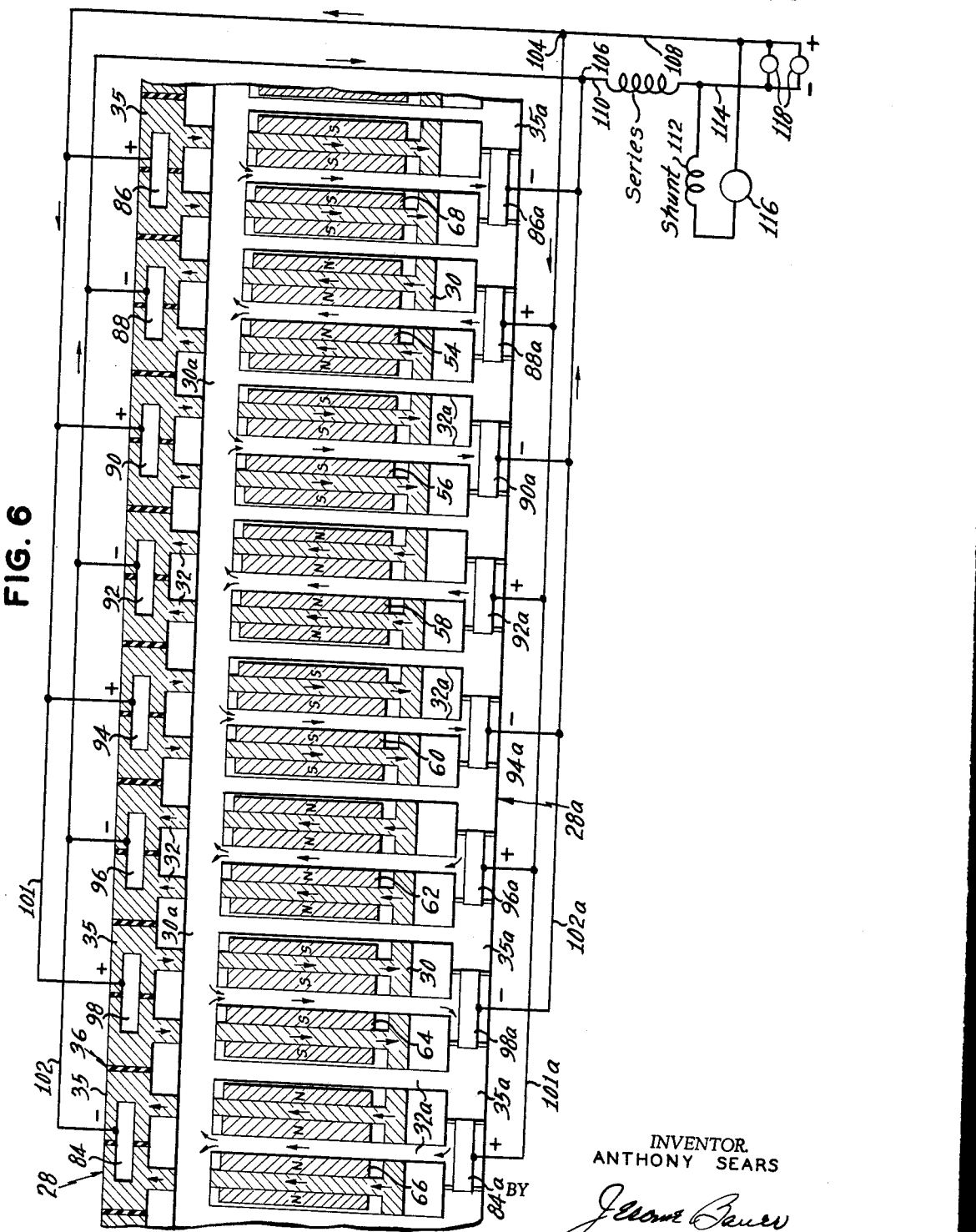

3,187,212
DIRECT CURRENT GENERATOR
Anthony Sears, New York, N.Y.
(88–00 Shore Front Parkway, Rockaway Beach, N.Y.)
Filed Apr. 19, 1963, Ser. No. 274,130
7 Claims. (Cl. 310—178)

This invention is a continuation-in-part of co-pending application Serial No. 29,729, now abandoned, filed May 17, 1960, and relates to a direct current generator.

The accepted principle of direct current generators is to rotate a coil in a magnetic field thereby interrupting or cutting the magnetic lines of force of such field. Each time the coil cuts magnetic lines of force, a voltage is obtained and induced in the coil. The pressure of the induced voltage and output current varies and increases in accordance with the number of magnetic lines of force which the coil cuts or interrupts. This manner of inducing a voltage in a rotating coil results in obtaining an output current that continuously varies in pressure and direction as the rotating coil moves into and out of the magnetic field. The variations in voltage pressure produces waves or ripples of continuously increasing and decreasing output current. These ripples are in the form of pulsations which reach their peak when the coil is cutting the greatest number of magnetic lines of force and are at their lowest value when the coil is rotated outside the magnetic field.

Hence, it is desirable to have an electric generator capable of producing direct current that is continuous and free of such pulsations. Accordingly, an object of this invention is to provide a direct current generator that produces a steady, non-pulsating direct current that is uniform in pressure, free of ripples, and that has a constant direction of flow as opposed to alternating current.

Another object of the invention is to provide a generator that utilizes the beneficial features of homopolar type generators and those of coil wound generators by connecting together a plurality of separate inductors into a single conductive structure in which a voltage may be induced and from which current may seek its own path of egress.

Still another object of the invention is to provide a generator that is compact, relatively simple and economical to construct, and one that produces a relatively high current output.

Still another object of the invention is to provide a generator in which the induced voltage and current may be increased and magnified by an additive arrangement of coupled conductive structures each having a plurality of separated inductors.

Figure 3:
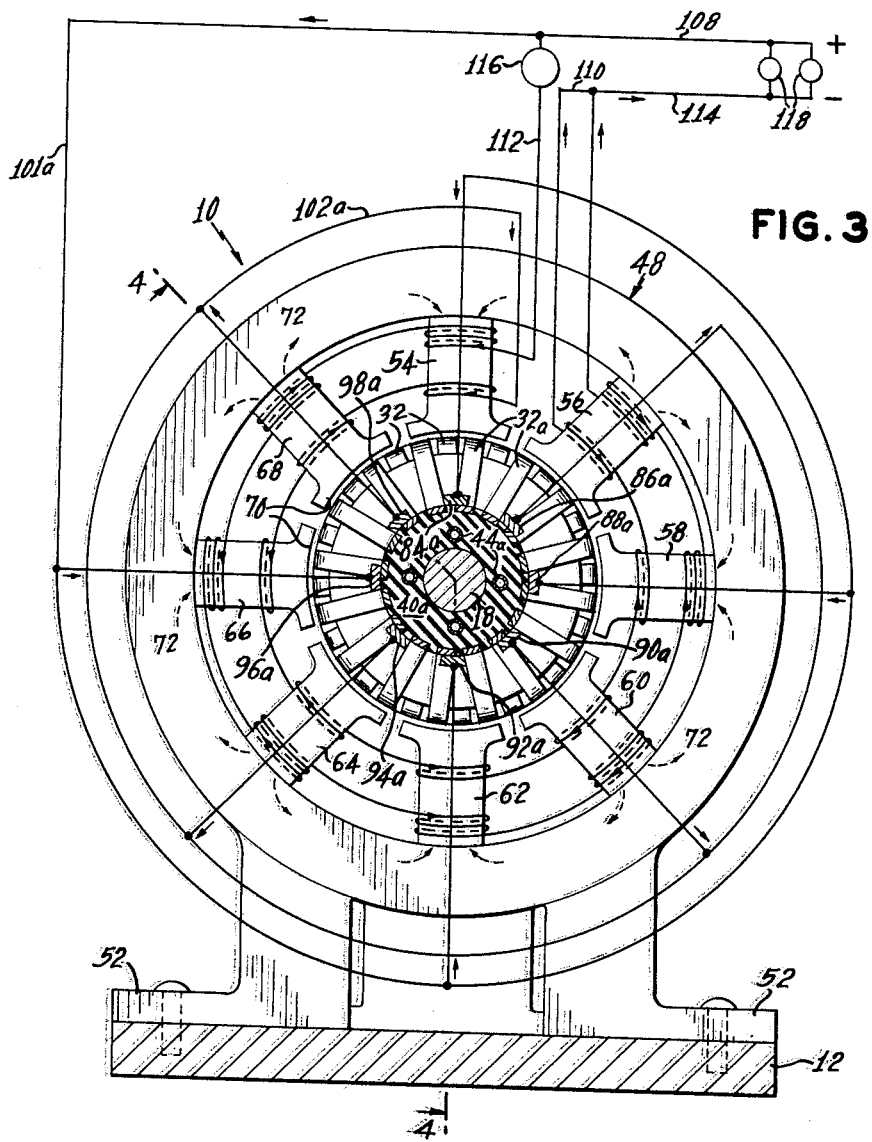
Figure 7:
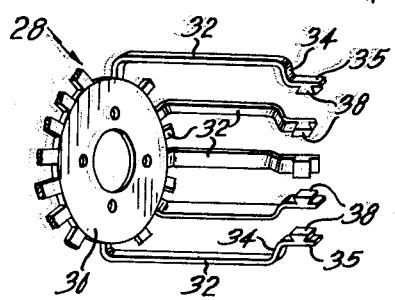
Figure 4:
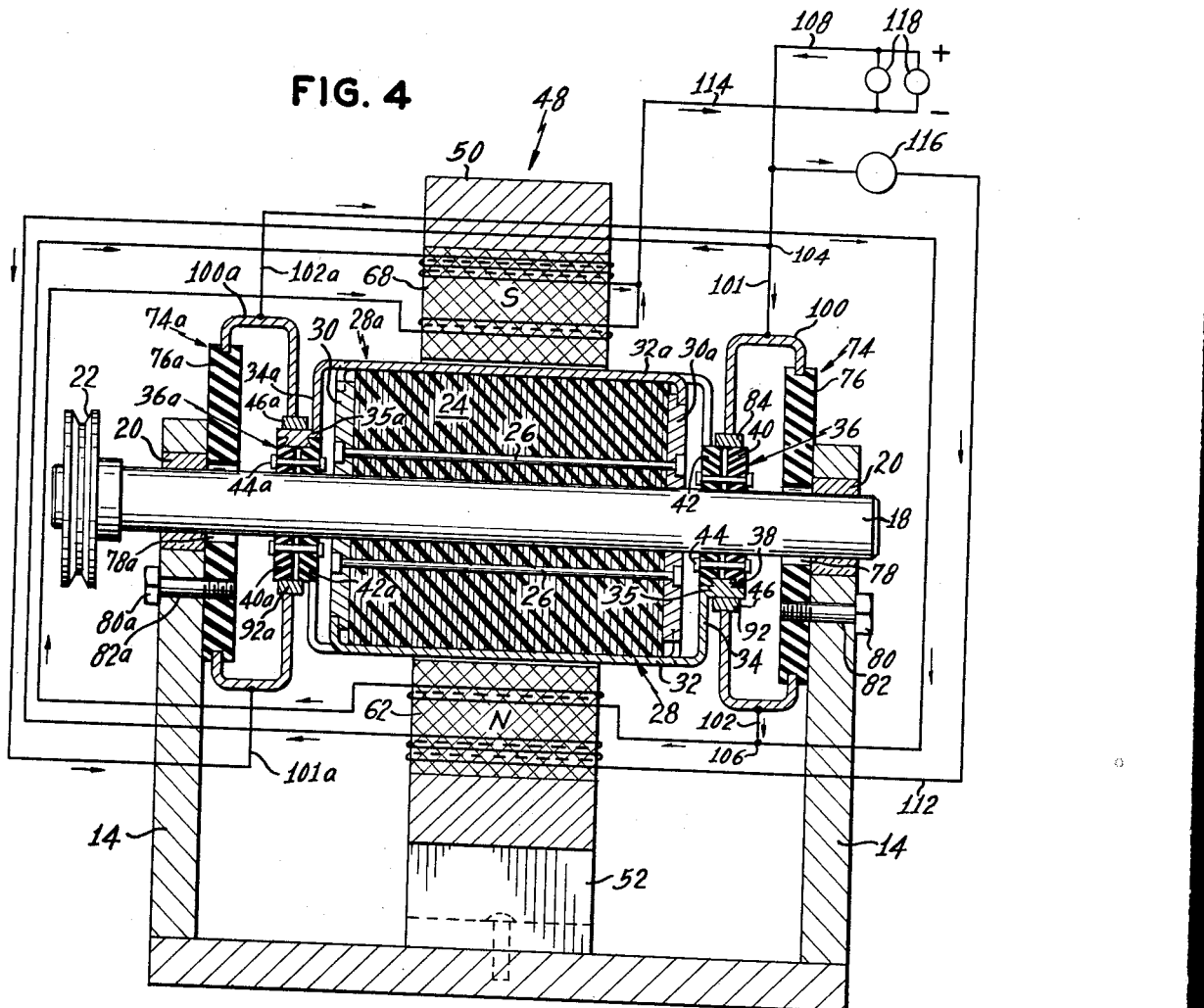
Figure 5:
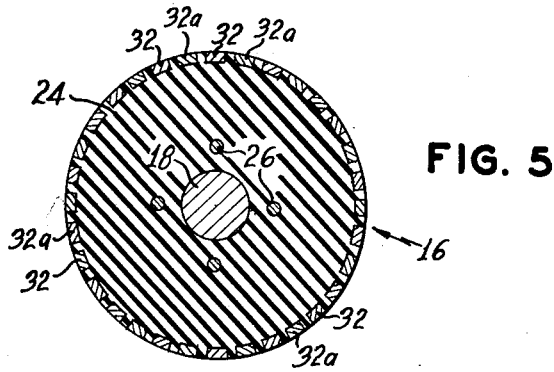

Other and further objects of my invention reside in the structures and arrangements hereinafter more fully described with reference to the accompanying drawings in which:

FIG. 1 is a side elevation of a generator constructed in accordance with the teaching of the invention and with a portion thereof removed, FIG. 2 is an end elevation of the generator shown in FIG. 1 with portions thereof deleted, FIG. 3 is a section of FIG. 1 taken along lines 3—3, FIG. 4 is a section of FIG. 3 taken along lines 4—4, FIG. 5 is a section of FIG. 1 taken along lines 5—5, FIG. 6 is a diagrammatic development of the coupled conductive structures of the generator shown in FIG. 1 and their related separated inductors, and FIG. 7 is a perspective view of a cage structure.

Referring now to the drawings, the numeral 10 generally identifies a direct current generator comprising a base 12 to which vertical supports 14 are secured at the longitudinal ends thereof. Mounted for rotation and supported between the vertical end supports 14 is a rotor structure or assembly generally identified by the numeral 16 (see FIGS. 1, 4 and 5). Rotor structure 16 comprises a driven rotor shaft 18 that rotates in bearings 20 (FIG. 4) retained in the supports 14.

Secured to one end of the shaft 18 and employed to rotate the same is a driving pulley 22. Included in the rotor structure 16 is a rotor core 24 that is mounted on the shaft 18 for rotation therewith intermediate the ends thereof and between the vertical supports 14. The rotor core 24 is composed of a plurality of laminations each conveniently secured together by a plurality of suitable securing means or bolts 26.

The rotor structure 16 may include at least one or more electrically conductive cage structures of the type more clearly seen in FIG. 7 and generally identified by the numeral 28. Those skilled in the art will readily recognize as the description proceeds that although a single cage structure 28 of the type shown in FIG. 7 may be employed in the generator 10, it is within the contemplation of the present invention that a plurality of such structures are capable of being utilized. For this reason, therefore, the drawings and the description disclose the invention utilizing a plurality of cage structures 28. However, the invention should in no way be limited by this reference to the drawings and the description nor by the number of cage structures 28 shown or referred to hereinafter since the following description and the drawings are intended only to enable an easier explanation and more convenient understanding of the invention.

Cage structure 28 comprises an endless or unbroken electrically conductive ring-shaped member 30 that serves to electrically interconnect a plurality of inductor arms 32 all of which radiate in spaced circumferential relationship from the periphery thereof. The inductor arms 32 are electrically interconnected with each other at their one end by the endless ring-shaped member 30 and thereby retained in relative spaced relationship. When the cage 28 is mounted as part of the rotor assembly 16, the ring-shaped member 30 is positioned at one end of the rotor core 24 and about the rotor shaft 18 while its inductors 32 are suitably secured to the core 24 to form an integral part of the rotor structure 16 for coincidental rotation therewith.

In practice the periphery of the laminations of the rotor core 24 may be provided with a plurality of longitudinally extending spaced slots equal in number and in relative spacing to the inductors 32 to receive and accommodate the same in circumferentially spaced relationship thereabout. Each inductor arm 32 is thus maintained on the rotor core 24 in parallel relationship with the axis of rotation of its respective conductive ring member 30. The opposite free or terminating ends of the inductors 32 are bent radially inward at 34 proximate the opposite end of the rotor core 24 and then longitudinally as at 35. The free terminating ends 35 of the inductors 32 are then secured together in their circular spaced relationship about the rotor core 16 and the shaft 18 by a dielectric structure generally identified by the numeral 36 (FIG. 4).

Each inductor 32 is provided at the underside of its terminating end 35 with a male mortise shaped lock 38. The locking mortise 38 fits in mating relationship with a female locking mortise defined in a pair of separated insulator rings 40 and 42 that are subsequently suitably riveted or otherwise secured together as at 44. The rings 40 and 42 and inductor ends 35 complete a circular arrangement of insulated circumferentially spaced inductors, the circular outer surface of which defines a commutator ring 46.

Thus, every inductor member 32 is connected with each and every other inductor member of the same cage structure 28 by the electrically conductive ring shaped member 30 connected thereto at one of the ends thereof. The other of the ends of the inductor members 32 are secured together in insulated spaced relationship and free of conductive connection with each other by the dielectric securing arrangement of the insulator rings 40 and 42 to define a complete circular commutator ring. Accordingly, the member 30 defines a closed electrical circuit or loop by way of which a voltage and current induced in any one inductor 32 of the cage structure will have access and the ability to flow in a path to each and every other inductor of the same cage.

The cage structure 28 thus described in connection with FIG. 7 is shown applied to the rotor core 24 in FIGS. 1, 4 and 6. Inasmuch as the invention contemplates the ability of including a plurality of such cage structures and because all other cage structures will be of substantially the same configuration as that shown in FIG. 7, the other cage structure shown in the figures of the drawings has been designated in a general manner by the numeral 28a. Accordingly, the inductor arms 32a thereof and the commutator ring 46a including the dielectric structure 36a and insulator rings 40a and 42a are identified by the use of the suffix letter "a" annexed to the same prefix numerals employed to designate like parts as the cage 28 in FIG. 7.

The cage structure 28a having the same details of construction as that of the cage 28 faces in the opposite direction of and in intersticed spaced relationship with the cage 28; that is to say, the continuous unbroken electrically conductive ring shaped member 30a is positioned at the end of the rotor core 24 opposite from that of the member 30 of the cage 28. Radiating from the continuous electric path member 30a are a plurality of electrically conductive inductor arms 32a. The inductor arms 32a are alternately positioned with respect to and extend longitudinally in a direction opposite from the inductor arms 32 of the cage 28. Like the cage structure 28, the inductor arms 32a are bent radially inwardly at 34a and then longitudinally at 35a to be retained between insulator rings 40a and 42a of the dielectric structure 36a that is secured together by a plurality of rivets or other suitable securing means 44a.

Thus, the inductors 32 and 32a of their respective cage structures 28 and 28a are alternately fixed to the rotor core 24 to form an integral part of the rotor assembly 16 and are maintained in this intersticed staggered relationship for rotation as an integral part of the rotor. Inasmuch as the endless electrical conductor members 32 and 32a of the respective cages 28 and 28a are disposed at opposite ends of the rotor core 24, their free or terminating ends 35 and 35a respectively are, in like manner, disposed at opposite ends of the rotor assembly 16. Hence, each cage has a commutator ring 46 and 46a respectively from which current induced in the inductor arms 32 and 32a respectively may be collected or taken.

Mounted on the base 12 of the generator 10 is a field assembly generally identified by the numeral 48. The field assembly 48 is secured to the base 12 by an encircling housing 50 at outwardly disposed flanges 52. The field assembly 48 comprises a plurality of pole pieces identified by the numerals 54, 56, 58, 60, 62, 64, 66 and 68. The pole pieces are arranged about the circumference of the rotor assembly 16 and each piece is provided with a face 70 that is elongated circumferentially. Each alternately disposed pole piece is of opposite magnetic polarity thus defining within the field assembly 48 a plurality of magnetic circuits each of which has a magnetic flux path and radiating magnetic lines of force that are interrupted and cut by the inductor arms 32 and 32a as the rotor assembly 16 is caused to rotate by the pulley 22 secured to the shaft 18 thereof.

The dotted arrowed lines 72 of FIG. 3 depict the direction of movement of the magnetic lines of force in the many magnetic circuits contained in the field assembly 48. It is to be understood that the scope of the invention is not intended to be limited by the number of pole pieces shown in the drawings or described herein since the same may be increased or decreased depending upon the size of the generator. In practical use it has been found that the arrangement and spacing of the circumferentially elongated pole faces 70 between each of the respective pole pieces be slightly less than the circumferential thickness of the inductor arms 32 and 32a rotating therewithin.

Hence, at all times all inductor arms will be cutting magnetic lines of force of at least one of the numerous magnetic circuits included in the field structure 48. It has been found that wire or round-shaped inductors may be substituted for the inductor bars shown in the drawings, which bars are shown to be rectangular in cross section. However, the rectangularly cross sectioned inductor bars cover a wider circumferential length of the rotor and, therefore, as the rotor assembly turns, the bar-shaped inductor arms shown will cut or interrupt a greater number of magnetic lines of force than will an inductor that is round in cross section.

Mounted adjacent to the commutator of the cage structure is a current collecting assembly generally identified by the numeral 74. Inasmuch as the drawings of the present invention disclose two commutator rings 46 and 46a resulting from the illustration of the plurality of cage structures 28 and 28a, there is provided in the present invention two current collecting assemblies 74 and 74a each one for a respective one of the commutator rings illustrated. Because the current collecting assemblies 74 and 74a are alike in construction, a description of the assembly 74 should suffice for that of 74a; except, however, that those details of structure and elements that are included in the assembly 74a will contain like numbers as that shown in the assembly 74 for like details of construction differing therefrom only in the addition of the suffix letter "a."

The current collecting assembly 74 comprises a dielectric ring-shaped mounting member 76 that is adapted to be releasably fastened against relative movement to the inner face of an adjacent vertical support 14. The mounting member 76 is provided with a central oversize opening 78 the wall of which is radially spaced from the rotor shaft 18 that extends therethrough. An adjustment bolt 80 is threaded into the mounting member 76 and passes through an arcuate shaped adjustment slot 82 defined in the adjacent vertical support 14. The bolt 80 may thus be loosened to permit limited relative rotation of the mounting member 76 with respect to its adjacent vertical support 14. A tightening of the bolt 80 thereafter permits securement of the mounting member in its adjusted rotated position.

The dielectric mounting member 76 serves to support a plurality of current collecting electrically conductive brush elements evenly numbered consecutively 84, 86, 88, 90, 92, 94, 96 and 98. It is to be noted that the number of electrical brush elements corresponds and is equal to the number of pole pieces included in the field assembly 48. The brush elements are secured in circumferentially spaced relationship about their respective commutator rings by brackets 100 that maintain the brush elements in proper electrical surface contact engagement with their respective commutator rings 46 and 46a.

Each brush element 84 to 98 inclusive is of sufficient circumferential extent as to always be in contact with at least one of the inductor arms 32 of its respective commutator ring 46. Hence, the circumferential extent of its electrical surface is greater than the circumferential extent of the insulating dielectric rings 40 and 42 that serve to maintain the terminating or free ends 35 of the inductors 32 in spaced circumferential relationship at the commutator ring. Naturally, the same conditions exist with respect to the brushes 84a to 98a inclusive of the current collecting assembly 74a and their relationship with the inductors 32a.

Thus, at all times, the electrical brush elements of the current collecting assembly 74 and 74a are in engagement and make electrical contact with the inductors of their respective commutator rings. In consequence, there is a continuous electrical path completed from any one inductor 32 of the cage structure 28 to any other inductor of the same cage by way of the connector member 30. In like manner, an electrical path is always conditioned between any one brush element of the current collecting assembly 74 and each and every inductor arm 32 of the cage structure 28. There is never any interruption of the flow of current induced in any one of the inductors of the cage 28 to the brush elements positioned about its respective commutator ring 46. Quite obviously, the same conditions may be said to be true with respect to the cooperation of the current collecting assembly 74a and the inductors 32a at the commutator ring 46a of the respective cage structure 28a.

Those skilled in the art will recognize that the rotation of the rotor assembly 16, facilitated by its pulley 22, will cause the inductors 32 and 32a positioned circumferentially thereabout to interrupt and cut the magnetic lines of force of the plurality of magnetic circuits of the field structure 48. This results in inducing a voltage and current in the inductors. The induced current may be collected or directly taken off from the inductors at the brush elements of the respective current collecting assemblies 74 and 74a.

In the event a single cage structure 28 were included in the rotor assembly 16, the generator 10 would require but the single current collecting assembly 74. However, inasmuch as it is desirable to understand the fuller ramifications of the invention, a plurality of oppositely disposed cage structures 28 and 28a have been illustrated. In such case, the alternate intersticed circumferentially spaced inductor arms of the respective cages 28 and 28a permit amplification of the voltage and current that might otherwise be induced in a rotor assembly having but a single cage structure 28.

Reference will now be made to FIGS. 3, 4 and 6 wherein the wiring or electrical connections of the elements is more fully illustrated. To assure that an electrical path will continuously be made through the brush elements of the current collector assembly 74 from the inductors 32 of the related cage structure 28, the positive brush elements are joined in parallel by conductor 101. The negative brush elements are joined by conductor 102. In FIGS. 3 and 6, it will be noted that the respective positive and negative brush elements of the assembly 74a are parallel connected in sets by respective conductors 101a and 102a.

The inductors 32 and 32a shown in FIG. 6 have been drawn disproportionate and narrowed in width in order to more clearly show the pole pieces therebeyond. Similarly, the ends 35 and 35a of the inductors have been widened to more clearly illustrate their function. For purposes of illustration, the diagrammatic view of FIG. 6 illustrates the parallel electrical connection of the inductors 32a with the inductors 32 of their respective cages 28a and 28 by way of the connection of the current collecting assemblies 74a and 74. This electrical connection between the current collecting assembly 74a and 74 is made by connecting the conductors 101 and 101a at 104 while conductors 102 and 102a at joined at 106.

The electrical circuit connecting the plurality of electrical conductor assemblies 74 and 74a for the purpose of collecting current induced in the inductors 32 and 32a of the rotor assembly 16 is completed by the lines 108 and at 110 just prior to a series winding to be described. The conductor 108 is connected to the positive brushes of both of the current collecting assemblies. In like manner, the negative side 110 is electrically joined with both of the negative brushes of the assemblies. Consequently, the voltage and current induced in the inductors 32 and 32a are placed in additive arrangement by electrically coupling the same in parallel arrangement at their respective current collecting assemblies.

The electrical wiring of the generator 10 is completed by a compound wiring of the pole pieces of the field assembly 48 with the load and current collecting assemblies 74 and 74a. In the present invention, this may be accomplished in any convenient manner; however, as shown in FIGS. 3, 4 and 6 of the drawings, the line 110 may serve as the series winding about the pole pieces. Also included in the circuit of the compound wiring is a shunt winding 112 for the energization of the pole pieces of the field assembly 48.

The shunt winding 112 may be tapped into the conductor line 108 and the negative side 114. Included in the shunt winding 112 is a variable resistor 116 that serves to vary the input current for continued energization of the pole pieces of the field assembly 48. This enables a more accurate control of the density of the flux or concentration of the magnetic lines of force of each of the magnetic circuits and, consequently, facilitates an accurate control of the current output of the generator 10.

In actual use there is always some residual magnetism in the pole pieces of the field assembly 48. Thus, as the rotor assembly 16 is turned by the pulley 22, the inductors 32 and 32a, forming a part thereof, interrupt and cut across the lines of residual magnetic flux of the magnetic circuits and, therefore, have induced therein a voltage and current that is collected at the current collecting assemblies 74 and 74a. The collected current is then transmitted to the load 118 that is connected in parallel with the rotor 16 by the lines 108 and 110.

Continued rotation of the rotor assembly 16 within the residual magnetic flux paths of the magnetic circuits set up in the field assembly 48 tends to build up the voltage and current induced in the inductors of the rotor assembly. The induced current is conducted back to the pole pieces 54 to 68 inclusive of the field assembly 48 by the series wound connector 110 thereby energizing such pole pieces and increasing the density of the flux paths of the magnetic circuits thereof. As a result, continued rotation of the inductors interrupt and cut across gradually denser flux paths and the increased lines of magnetic force of the same. The result is that there is a rapid build up of energization of the pole pieces and, accordingly, the rapid build up of voltage and current induced in the inductors of the rotor assembly 16.

Quite obviously, the voltage and current induced in the rotor assembly can be varied by varying the speed of rotation of such assembly or by varying the voltage of the shunt coil at 116. However, in order for the generator 10 to operate at its maximum efficiency, the brush contacts 84 to 98 and 84a to 98a should be aligned with the line of demarcation of the magnetic circuits set up between the pole pieces of the field assembly 48. Because the flux paths of the magnetic circuits have a tendency to process in accordance with the speed of rotation of the rotor assembly 16, it is necessary to be able to reset or adjust the current collector assemblies 74 and 74a to align their respective brush contacts with such lines of demarcation of the magnetic circuits. This is accomplished by loosening and subsequently retightening the adjustment bolts 80 and 80a after rotating the respective assemblies 74 and 74a to align their brushes with the lines of demarcation of the magnetic circuits. Once again, in practice the degree of the adjustment of the assemblies 74 and 74a is usually predetermined for a given speed of rotation of the rotor assembly 16.

It will be recognized that during all periods of rotation of the rotor assembly 16 at least one of the inductors 32 or 32a will interrupt and cut across lines of force of the magnetic circuits present at the pole pieces of the field assembly 48. In FIG. 6, the purposely disproportionately shown inductors 32 and 32a enable us to view the pole pieces. The arrows placed on the conductors and their connecting conductive members 30 and 30a indicate the direction of movement of the current induced in the cage structures 28 and 28a as the rotor assembly 16 turns within the field assembly 48.

Therefore, in the arrangement shown in FIG. 6 wherein, certain of the inductors 32a are positioned between the pole pieces and not cutting magnetic lines of force, the voltage and current induced in the remaining ones of the inductors 32a cutting magnetic lines of force and positioned beneath the pole pieces, will move in the direction of the arrows thereshown on the inductors. The induced current then flows from the inductors 32a to the connecting member 30a and then to that inductor 32a that is momentarily being engaged by a brush contact. On the other hand the inductors 32 of the cage structure 28 are all shown momentarily cutting lines of force of the magnetic circuits of the field assembly 48. Each of these inductors 32 consequently have a voltage and current induced therein that moves in the direction of the arrows and that may be collected therefrom at the brush contacts numbered 84 to 98 inclusive.

Therefore, current induced in any one of the inductors of any one of the cage structures 28 or 28a will have access and be connected with every other inductor of the same cage by way of the conductive members 30 or 30a respectively thereof. At no time will the direction of current flow be reversed as is the case in presently known wire loop wound generators because in the present invention the current induced in any of the inductors is always permitted to flow to every other inductor of the same cage and then to the brushes momentarily in contact therewith. This flow is afforded by the conductive member 30. The unique cage assembly 28 thus provides a constant unidirectional path that enables the flow of current from the inductors to the brush contacts without change in direction of movement of the current. In consequence, the brush contacts are able to collect and remove current from any one related inductor of a specific cage structure even though such inductor may not, at the moment, be cutting lines of force itself.

The arrows applied to the cage structures 28 and 28a in FIG. 6 depict the assumed direction of movement or flow of the current induced in the inductors of the respective cage structures. The flow of current thereshown results from the connection of the plurality of cage structures with each other. In each cage structure, it will be noted that the respective inductors thereof, being connected together by the return ring 30, provide a completed path for the movement of current to any brush elements that may be making contact with any other inductor of the same cage thereby permitting the collection of current from any inductor of the cage even though such inductor itself does not at that moment have a voltage and current induced therein.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a generator, a single field structure, a solid circular laminated rotor core rotatable within said field structure, inductor means mounted in spaced relationship about and unitarily rotatable with said core, endless means electrically connecting one of the ends of alternate ones of said inductor means, endless means electrically connecting one of the ends of the remaining alternate inductor means, each of said electrical connection means being disposed at opposite ends of said rotor core, and means connecting together the other ends of each of said alternate ones of said inductor means in insulated spaced relationship to define two commutator rings one each at opposite ends of said rotor core and to define two separate inductor cages, said rotor core providing a continuous and simultaneous magnetic path for each one of said inductor means spaced thereabout.

2. In a generator as in claim 1, electrical brushes cooperating with respective ones of said two commutator rings.

3. A generator comprising a solid circular laminated rotor including a plurality of separate inductor cages, each of said cages having a plurality of spaced inductor elements interconnected electrically endlessly with each other, a commutator ring including means retaining said inductors in insulated spaced relationship, alternate ones of said inductor elements of one of said cages being in intersticed circumferential relationship about said rotor with respect to alternate ones of said inductors of another of said plurality of cages, a single field structure including a plurality of pole pieces of opposite polarity alternately positioned about said circular rotor, said rotor providing a continuous and simultaneous magnetic path for each of said inductor elements spaced about the circumference thereof, and current collecting means engaging said commutator rings.

4. In a generator as in claim 3, and means connecting said cages electrically.

5. A generator comprising a circular rotor, a field structure about said rotor, said field structure having a plurality of pole pieces of opposite polarity positioned alternately about said rotor, each set of oppositely poled pieces having a magnetic field, means to rotate said rotor in said magnetic fields, a circularly arranged conductive cage positioned about and rotatable with said rotor and including an unbroken conductive member having arms radiating therefrom each to interrupt said magnetic fields as said rotor rotates, said circular rotor forming a continuous and simultaneous magnetic path with said field structure for each one of said arms positioned thereabout and rotatable therewith as the same rotates in said field structure, means securing the terminating ends of said arms in insulated spaced relationship, and brush means continuously engaging at least one of said spaced arms during the rotation of said rotor.

6. A generator comprising a field structure having a plurality of circumferentially disposed pole pieces, each of said pole pieces being alternately of opposite magnetic polarity, a circular rotor, said rotor comprising a plurality of separate conductive cages, said cages each having a plurality of inductors between said rotor and field structure, means to endlessly connect together the inductors of each of said respective cages, said inductors of one of said cages being mounted circumferentially about said rotor in alternate intersticed relationship with respect to said inductors of others of said plurality of cages, said rotor providing a continuous and simultaneous magnetic path for each one of said plurality of inductors mounted about the circumference thereof, current collecting means cooperating with respective ones of said cages and engaging at least one of said inductors of its respective cage continuously during the rotation of said rotor.

7. A generator as in claim 6, and means electrically connecting the cages together.

References Cited by the Examiner

UNITED STATES PATENTS

| | | | |
|---|---|---|---|
| 400,838 | 4/89 | Entz | 310—178 |
| 401,317 | 4/89 | Weston | 310—201 |
| 517,105 | 3/94 | Henderson | 310—137 |
| 1,430,130 | 9/22 | Warder | 310—137 X |
| 2,381,533 | 8/45 | Forss | 310—233 |
| 2,418,607 | 4/47 | Suydam | 310—201 X |
| 2,953,699 | 9/60 | Redding | 310—258 |

MILTON O. HIRSHFIELD, *Primary Examiner.*